(12) United States Patent
Taghavi et al.

(10) Patent No.: US 11,527,084 B2
(45) Date of Patent: Dec. 13, 2022

(54) METHOD AND SYSTEM FOR GENERATING A BIRD'S EYE VIEW BOUNDING BOX ASSOCIATED WITH AN OBJECT

(71) Applicants: Ehsan Taghavi, Toronto (CA); Amirhosein Nabatchian, Maple (CA); Bingbing Liu, Singapore (SG)

(72) Inventors: Ehsan Taghavi, Toronto (CA); Amirhosein Nabatchian, Maple (CA); Bingbing Liu, Singapore (SG)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 108 days.

(21) Appl. No.: 16/926,096

(22) Filed: Jul. 10, 2020

(65) Prior Publication Data

US 2022/0012466 A1    Jan. 13, 2022

(51) Int. Cl.
| | |
|---|---|
| G06T 7/00 | (2017.01) |
| G06V 20/64 | (2022.01) |
| G06T 3/60 | (2006.01) |
| G06K 9/62 | (2022.01) |
| G06T 7/20 | (2017.01) |
| G06V 20/56 | (2022.01) |

(52) U.S. Cl.
CPC ......... *G06V 20/647* (2022.01); *G06K 9/6261* (2013.01); *G06T 3/60* (2013.01); *G06T 7/20* (2013.01); *G06V 20/56* (2022.01); *G06T 2207/10028* (2013.01); *G06T 2207/30252* (2013.01)

(58) Field of Classification Search
CPC ........... G06K 9/00208; G06K 9/00791; G06K 9/6261; G06T 3/60; G06T 7/20; G06T 2207/10028; G06T 2207/30252
See application file for complete search history.

(56) References Cited

U.S. PATENT DOCUMENTS

| | | |
|---|---|---|
| 2015/0002636 A1 | 1/2015 | Brown |
| 2018/0025532 A1 | 1/2018 | Lam et al. |
| 2019/0096086 A1 | 3/2019 | Xu et al. |

(Continued)

OTHER PUBLICATIONS

Liang, Ming, et al. "Deep continuous fusion for multi-sensor 3d object detection." Proceedings of the European Conference on Computer Vision (ECCV). 2018. (Year: 2018).*

(Continued)

*Primary Examiner* — Sean M Conner
*Assistant Examiner* — Denise G Alfonso

(57) ABSTRACT

A system and method for generating a bounding box for an object in proximity to a vehicle are disclosed. The method includes: receiving a three-dimensional (3D) point cloud representative of an environment; receiving a two-dimensional (2D) image of the environment; processing the 3D point cloud to identify an object cluster of 3D data points for a 3D object in the 3D point cloud; processing the 2D image to detect a 2D object in the 2D image and generate information regarding the 2D object from the 2D image; and when the 3D object and the 2D object correspond to the same object in the environment: generating a bird's eye view (BEV) bounding box for the object based on the object cluster of 3D data points and the information from the 2D image.

14 Claims, 6 Drawing Sheets

(56) References Cited

U.S. PATENT DOCUMENTS

2021/0366144 A1* 11/2021 Magistri ............... G06V 20/58

OTHER PUBLICATIONS

Liu, Kaiqi, and Jianqiang Wang. "Fast dynamic vehicle detection in road scenarios based on pose estimation with convex-hull model." Sensors 19.14 (2019): 3136. (Year: 2019).*

Gong, Zheng, et al. "A Frustum-based probabilistic framework for 3D object detection by fusion of LiDAR and camera data." ISPRS Journal of Photogrammetry and Remote Sensing 159 (2020): 90-100. (Year: 2020).*

Petrovskaya and S. Thrun, "Model based vehicle tracking for autonomous driving in urban environments," in Proceedings of Robotics: Science and Systems IV, Zurich, Switzeriand, 2008 2008.

X. Shen, S. Pendleton and M. H. Ang, "Efficient L-shape fitting of laser scanner data for vehicle pose estimation," in Proceedings of IEEE 7th International Conference on Cybernetics and Intelligent Systems (CIS) and IEEE Conference on Robotics, Automation and Mechatronics (RAM), 2015. 2015.

X. Zhang, W. Xu, C. Dong and J. M. Dolan, "Efficient L-shape fitting for vehicle detection using laser scanners," in Proceedings of the IEEE Intelligent Vehicles Symposium (IV), 2017. 2017.

D. Kim, K. Jo, M. Lee and M. Sunwoo, "L-shape model switching-based precise motion tracking of moving vehicles using laser scanners," IEEE Transactions on Intelligent Transportation Systems, vol. 19, No. 2, 2018. 2018.

D. Xu, D. Anguelov and A. Jain, "Pointfusion: Deep sensor fusion for 3d bounding box estimation," in Proceedings of the IEEE Conference on Computer Vision and Pattern Recognition, 2018. 2018.

Y. Zhou and O. Tuzel, "Voxelnet: End-to-end learning for point cloud based 3d object detection," in Proceedings of the IEEE Conference on Computer Vision and Pattern Recognition, 2018. 2018.

R. Qi, W. Liu, C. Wu, H. Su and L. J. Guibas, "Frustum PointNets for 3D Object Detection from RGB-D Data," in Proceedings of the IEEE Conference on Computer Vision and Pattern Recognition, 2018. 2018.

Tang, W. Luo and R. Urtasun, "PIXOR: Real-time 3D Object Detection from Point Clouds," in Proceedings of the IEEE Conference on Computer Vision and Pattern Recognition, 2018. 2018.

J. Ku, M. Mozifian, J. Lee, A. Harakeh and S. L. Waslander, "Joint 3d proposal generation and object detection from view aggregation," in Proceedings of the IEEE/RSJ International Conference on Intelligent Robots and Systems (IROS), 2018. 2018.

Nezhadarya, Y. Liu and B. Liu, "BoxNet: A Deep Learning Method for 2D Bounding Box Estimation from Bird's-Eye View Point Cloud," in Proceedings of the IEEE Intelligent Vehicles Symposium (IV), 2019. 2019.

Wan, E. A. and Van Der Merwe, R., "The Unscented Kalman Filter for Nonlinear Estimation," in Proceedings of the IEEE Conference on Adaptive Systems for Signal Processing, Communications, and Control Symposium, 2000. 2000.

Fortmann, Thomas E and Bar-Shalom, Yaakov and Scheffe, Molly, "Multi-target tracking using joint probabilistic data association," in Proceedings of 19th IEEE Conference on Decision and Control including the Symposium on Adaptive Processes, 807-812, 1980. 1980.

Vermaak, Jaco and Godsill, Simon J and Perez, Patrick, "Monte Cado filtering for multi target tracking and data association," IEEE Transactions on Aerospace and Electronic systems, vol. 41, No. 1, 309-332, 2005. 2005.

Z. Zhao, P. Zheng, S. Xu and X. Wu, "Object Detection With Deep Learning: A Review," in IEEE Transactions on Neural Networks and Learning Systems, vol. 30, No. 11, pp. 3212-3232, Nov. 2019. 2019.

C. R. Qi, W. Liu, C. Wu, H. Su and L. J. Guibas, "Frustum PointNets for 3D Object Detection from RGB-D Data," 2018 IEEE/CVF Conference on Computer Vision and Pattern Recognition, Salt Lake City, UT, 2018, pp. 918-927 2018.

Gong, Zheng and Lin, Haojia and Zhang, Dedong and Luo, Zhipeng and Zelek, John and Chen, Yiping and Nurunnabi, Abdul and Wang, Cheng and Li, Jonathan, "A Frustum-based Probabilistic Framework for 3D Object Detection by Fusion of LiDAR and Camera Data", ISPRS Journal of Photogrammetry and Remote Sensing, vol. 159, Jan. 2020, pp. 90-100. 2020.

S. Roweis and Z. Ghahramani, "A Unifying Review of Linear Gaussian Models," in Neural Computation, vol. 11, No. 2, pp. 305-345, Feb. 15, 1999. 1999.

* cited by examiner

METHOD AND SYSTEM FOR GENERATING A BIRD'S EYE VIEW BOUNDING BOX ASSOCIATED WITH AN OBJECT

FIELD

The present disclosure relates to generating Bird-Eye-View (BEV) bounding boxes associated with objects.

BACKGROUND

An autonomous vehicle includes many different types of sensors which sense an environment surrounding the vehicle. A perception module of an autonomous vehicle may process sensor data received from each of the different types of sensors to identify objects of interest (e.g., pedestrians or other cars). For example, a scanning Light Detection and Ranging (LIDAR) sensor generates sensor data representative of a three-dimensional (3D) point cloud and the perception module processes the 3D point cloud to identify objects of interest. A camera generates sensor data as image data representative of images and the perception module processes the image data to detect and identify objects of interest. Each sensor may generate a different type of sensor data that can be used by the perception module for object identification for use in autonomous driving.

The perception module can perform bounding box regression on a 3D point cloud, which may include partially visible objects. Bounding box regression generally requires predicting dimensions and an angle of a bounding box.

A point cloud is a collection of data points defined by a given coordinates system, which can be the coordinate system of a sensor that has initially generated the data points, such as the LIDAR sensor. In a 3D coordinates system, for example, a point cloud may include data points that are used to define the shape of one or more physical objects in an environment. Point clouds are used to create 3D meshes and other models used in 3D modeling for various fields including medical imaging, architecture, 3D printing, manufacturing, 3D gaming and various virtual reality (VR) applications.

In a 3D Cartesian coordinates system, a data point is represented by three values that, taken together, correlate to a precise point in space relative to a point of origin at (0, 0, 0). Each of the three value is associated with a respective axis in the 3D Cartesian system. Therefore, a data point in a point cloud may include at least three values (x, y, z), and optionally, may include a value representing an intensity value of a laser beam that has generated the data point, and a value representing a class of an object in the point cloud, where the data point may be associated with the object.

A point cloud is typically processed in real-time, or near real time, for predicting the dimensions and the angle of a bounding box based on the data points in the point cloud.

A challenge in processing a point cloud in real time is fitting bounding boxes around objects with accurate orientation and dimension. Most of the known methods for processing a point cloud focus on finding L-shape geometry of an object and fitting a rectangular bounding box around the object based on the L-shape geometry of the object. However, for an object at an average distance of larger than a certain threshold (e.g. 30 meters) from the vehicle, the problem of fitting a bounding box for the object becomes more difficult to solve due to a sparsity of data points included in the 3D point cloud, which means that the object is only partially visible in a 3D point cloud. When the object is only partially visible, estimating the center and dimension of the object becomes error-prone, especially at long ranges.

Some existing solutions to generate bounding boxes for partially visible objects use deep learning methods with end-to-end training to output a bounding box for a partially visible object, but deep learning methods are usually computationally expensive and difficult to implement on a vehicle with limited amount of computing resources. Some of the existing deep learning methods utilize information from both 2D images and 3D point clouds, where for example, image data is processed using a Convolutional Neural Network (CNN) to generate parameters (e.g. size, location, and orientation) of a bounding box for an object based on the image data, and the point cloud is independently processed using a PointNet™ respectively to generate parameters (e.g. size, location, and orientation) of a bounding box for an object based on the point cloud. The resulting parameters of the bounding boxes generated by the CNN and PointNet™ respectively are then combined by a fusion network. The outputs of the CNN and PointNet™ can be feature matrices of arbitrary sizes. For example, outputs of a CNN usually include a width, a height, and a channel, and for outputs of a PointNet™, which is a point cloud processing technique using neural networks, usually include a number of the points and one or more channels. By using the 3D point cloud as spatial anchors, the fusion network predicts multiple hypotheses for the parameters (e.g. size, location, and orientation) of a 3D bounding box for the objects and the confidence values for the parameters. In some other works, 3D point clouds are used for both object classification and a bounding box regression. For instance, a deep neural network called PIXOR™ is proposed as a single-stage detector that outputs estimates for parameters (e.g. size, location, and orientation) of a bounding box for an oriented 3D object. In another example, a trained deep neural network called BoxNet™ performs bounding box estimation for an object in a 3D point cloud based on the 3D point cloud and image data representative of a corresponding two-dimensional (2D) bird's eye view image. Although these known deep learning methods may output promising results in terms of location, orientation and size of the bounding boxes, these deep learning methods are computationally intensive because they tend to require a large amounts of computing resources (e.g. memory and processing resources) to perform bounding box estimation, and will not work when there are insufficient amount of labeled data points in the point cloud. For example, both data points having labels including parameters of 3D bounding boxes for objects in the point cloud, and labeled image data having labels including parameters of 2D bounding boxes for objects in the image data, are required in order to train the neural networks of these known deep learning methods. These limitations render the deep learning methods unstable and unsuited for use in real time when the autonomous vehicle is on the road.

There is a need for an improved solution that can efficiently processes a 3D point cloud to generate bounding boxes for objects in a vehicle's path that may be at a distance, using less computing resource than required by traditional deep learning methods.

SUMMARY

The present disclosure provides a method, system, and computer-readable medium for generating a bird's eye view (BEV) bounding box for an object detected in proximity to a vehicle.

In one aspect, an example method includes: receiving a three-dimensional (3D) point cloud representative of an environment; receiving a two-dimensional (2D) image of the environment; processing the 3D point cloud to identify an object cluster of 3D data points for a 3D object in the 3D point cloud; processing the 2D image to detect a 2D object in the 2D image and generate information regarding the 2D object from the 2D image; and when the 3D object and the 2D object correspond to the same object in the environment: generating a bird's eye view (BEV) bounding box for the object based on the object cluster of 3D data points and the information from the 2D image.

In another aspect, a processing system for generating a bounding box for an object in proximity to a vehicle is disclosed. The processing system may include: a processing unit; and a memory coupled to the processing unit, the memory storing machine-executable instructions that, when executed by the processing unit, cause the processing system to: receive a 3D point cloud representative of an environment; receive a 2D image of the environment; process the 3D point cloud to identify a cluster of data points for a 3D object in the 3D point cloud; process the 2D image to detect a 2D object in the 2D image and generate information regarding the 2D object from the 2D image; and when the 3D object and the 2D object correspond to the same object in the environment: generate a bird's eye view (BEV) bounding box for the object based on the object cluster of 3D data points and the information from the 2D image.

By using real-time data representing a heading of the object, and various visual information from a 2D image that can be readily obtained on-board a vehicle, the search process for the best fit bounding box from a BEV based on a 3D point cloud is simplified, thereby computationally efficient and resource-friendly. The search process is non-iterative and does not require machine learning, and can be done in real time by a vehicle in autonomous or semi-autonomous driving mode. Specifically, when a heading of the vehicle is obtained from a series of 2D images or 3D point clouds taken in real time, the heading information can be used to rotate a cluster of data points in BEV to axis-align the cluster of data points with respect to the x-axis of the vehicle coordinate system, in order to reduce the number of candidate bounding boxes required to get the best fitting bounding box for the cluster of data points.

In all examples, generating the BEV bounding box may include: mapping the object cluster of 3D data points to a cluster of 2D data points on a 2D plane in a bird's eye view (BEV) and in a vehicle coordinate system of the vehicle; determining and storing a group of BEV polygon points on the 2D plane in the BEV, wherein the group of BEV polygon points forms a convex hull enclosing the cluster of 2D data points on the 2D plane; and generating the BEV bounding box based on the cluster of 2D data points on the 2D plane, the group of BEV polygon points, and the information from the 2D image. The disclosed embodiments herein provide an efficient system and method to find a best bounding box in BEV in a fast and robust manner against occlusion and partial observability. The embodiments implement a novel bounding box estimation process that utilizes the polygon shape of an object on a 2D plane for greater efficiency and better accuracy.

In all examples, generating the BEV bounding box may include: determining a center $p_{center}$ of the cluster of 2D data points on the 2D plane; determining an estimated heading $h_{obj}$ of the object; rotating the cluster of 2D data points around the center $p_{center}$ based on the estimated heading $h_{obj}$; determining a plurality of selected polygon points, from the group of BEV polygon points; determining a plurality of candidate bounding boxes, wherein each candidate bounding box is determined based on a respective selected polygon point from the plurality of selected polygon points; selecting a final bounding box to be the BEV bounding box from the plurality of candidate bounding boxes, wherein the final bounding box is one of the candidate bounding boxes that covers the most number of data points from the cluster of 2D data points on the 2D plane; and rotating the BEV bounding box based on the value of $h_{obj}$ around the center $p_{center}$ of the cluster of 2D data points on the 2D plane.

In some examples, determining the plurality of candidate bounding boxes may include, for each respective polygon point of the plurality of selected polygon points: generating four rectangle boxes of a pre-determined size; and selecting a rectangle box from the four rectangle boxes to be the candidate bounding box for the respective polygon point, wherein the selected rectangle box covers the most number of points from the cluster of 2D data points on the 2D plane compared to the rest of the four rectangle boxes.

In some examples, each of the four rectangle boxes has: a respective first side parallel to an x-axis of the vehicle in the vehicle coordinate system, and a respective second side parallel to a y-axis of the vehicle in the vehicle coordinate system.

In some examples, the first of the four rectangle boxes has a lower right corner coinciding with the respective polygon point, the second of the four rectangle boxes has a lower left corner coinciding with the respective polygon point, the third of the four rectangle boxes has an upper right corner coinciding with the respective polygon point, and the fourth of the four rectangle boxes has a upper left corner coinciding with the respective polygon point.

In some examples, the set of information from the 2D image may include: a class label associated with the object, a classification score associated with the class label, a size of the object, an image heading $h_{image}$ of the object, and an image heading uncertainty $\sigma_{image}^2$ associated with the image heading $h_{image}$ of the object.

In some examples, determining that the 3D object and the 2D object correspond to the same object in the environment may be based on: the class label associated with the object, the classification score associated with the class label, and the size of the object.

In some examples, determining the estimated heading $h_{obj}$ of the object may include: receiving or determining a tracked heading $h_{track}$ of the object and a tracked heading uncertainty $\sigma_{track}^2$ associated with the tracked heading $h_{track}$ of the object; computing and storing the estimated heading $h_{obj}$ of the object based on the image heading $h_{image}$ of the object and the tracked heading $h_{track}$ of the object; and computing and storing an estimated heading uncertainty $\sigma_{obj}^2$ of the object based on the image heading uncertainty $\sigma_{image}^2$ and the tracked heading uncertainty $\sigma_{track}^2$.

In some examples, to determine the tracked heading $h_{track}$ of the object, the system may include an implementation of: a Kalman filter, a Markov process, a Hidden Markov Model, a recursive Bayes filter, or a particle filter.

In some examples, $h_{obj}=f(h_{image}, h_{track})$ and $f(\ )$ is a function for computing an average value based on $h_{image}$ and $h_{track}$.

In some examples, $$h_{obj} = \frac{(h_{image} + h_{tracking})}{2}.$$

In some examples, $\sigma_{obj}^2 = g(\sigma_{image}^2, \sigma_{track}^2)$ and g( ) is a function for calculating an average value based on $\sigma_{image}^2$, and $\sigma_{track}^2$.

In some examples, $\sigma_{obj} = \sqrt{\sigma_{image}^2 + \sigma_{track}^2}$.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems for localization of an autonomous vehicle. An autonomous vehicle may be any type of vehicle, such as a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects. Even though the vehicle control system described herein has been described to facilitate semi or fully autonomous driving, it can also be used for vehicles during non-autonomous driving mode.

Figure 1:
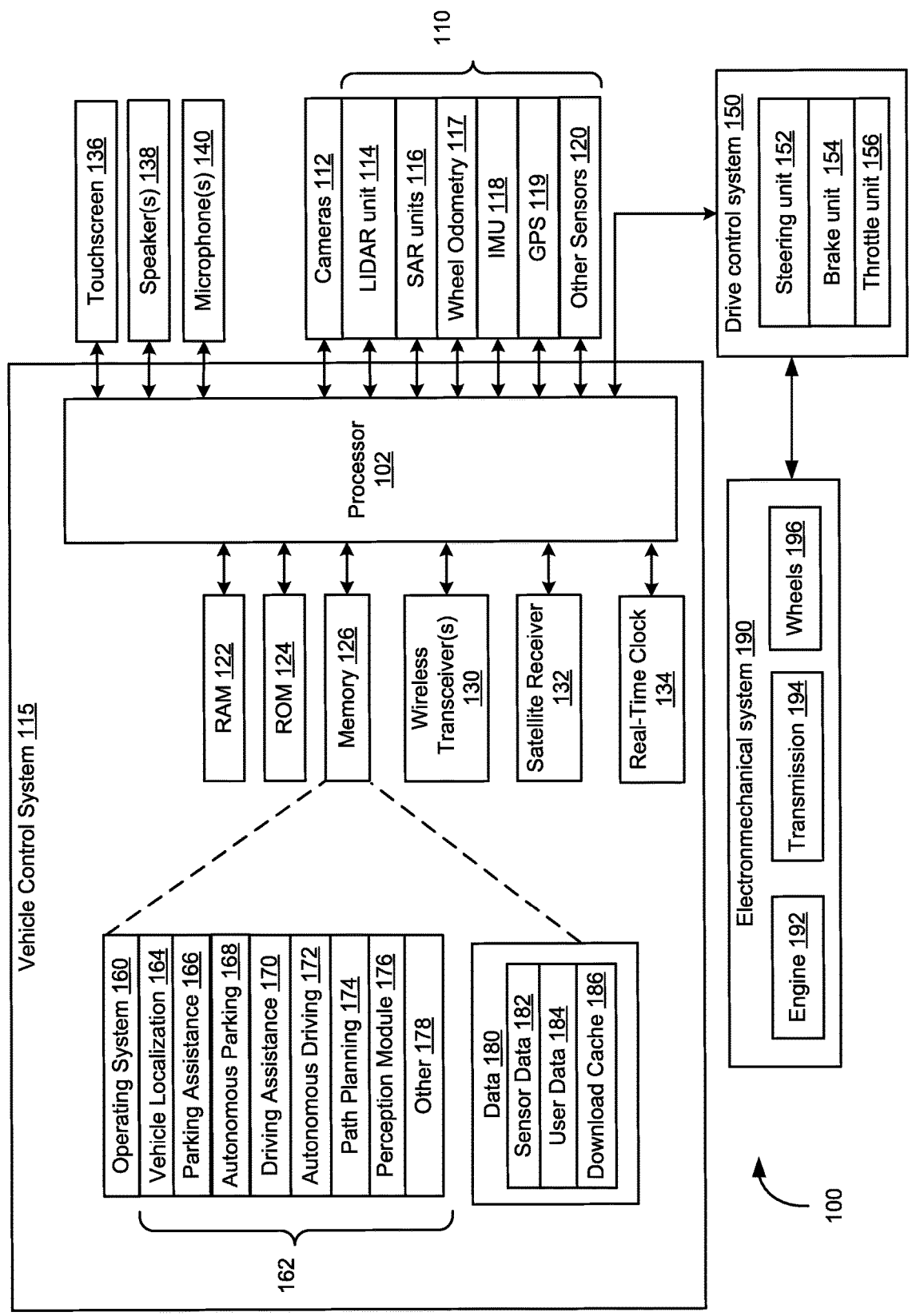
FIG. 1 is a block diagram illustrating some components of an example autonomous vehicle.

FIG. 1 illustrates selected components of an autonomous vehicle 100 in accordance with an example embodiment of the present disclosure. The vehicle 100 comprises a vehicle control system 115 that is connected to sensors or a sensor system 110, a drive control system 150 and a mechanical system 190. The vehicle 100 also comprises various structural elements such as a frame, doors, panels, seats, windows, mirrors and the like that are known in the art but that have been omitted from the present disclosure to avoid obscuring the teachings of the present disclosure. The sensors 110 are mounted to structural elements of the vehicle 100 at various locations on the vehicle 100.

The vehicle control system 115 includes a processor 102 that is coupled to a plurality of internal components of the vehicle 100 via a communication bus (not shown). The processor 102 is coupled to a Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network, a satellite receiver 132 for receiving satellite signals from a satellite network, a real-time clock 134. The vehicle control system 115 is also coupled to other components of the vehicle 100, including the sensors 110, a touchscreen 136, speaker(s) 138, microphone(s) 140, the drive control system 150, and the mechanical system 190.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations of a wireless WAN (e.g., cellular network) within its geographic coverage area. The one or more wireless transceiver(s) 130 may send and receive signals over a wireless WAN. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as Ultra Wideband (UWB)), Z-Wave, ZigBee, ANT/ANT+ or infrared (e.g., Infrared Data Association (IrDA) communication).

The real-time clock 134 may comprise a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMO-LED) display, with a touch-sensitive input surface or overlay connected to an electronic controller. Additional input devices of the vehicle 100 (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 100. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information from a path planning module 174 stored in the memory 126 of the vehicle control system 115 and generate control signals to control the steering, braking and throttle of the vehicle 100, respectively to drive a planned path. The drive control system 150 may include additional components to control other aspects of the vehicle 100 including, for example, control of turn signals and brake lights.

The mechanical system 190 receives control signals from the drive control system 150 to operate the mechanical components of the vehicle 100. The mechanical system 190 effects physical operation of the vehicle 100. The mechanical system 190 comprises an engine 192, a transmission 194 and wheels 196. The engine 192 may be a gasoline-powered engine, a battery-powered engine, a hybrid engine, an electric for example. Other components may be included in the mechanical system 190, including, for example, turn signals, brake lights, fans and windows.

A graphical user interface (GUI) may be rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 that is executed by the processor 102. The memory 126 also has stored thereon a number of software modules collectively referred to as autonomous driving system 162 in addition to the GUI, where each module of the autonomous driving system (ADS) 162 is software that includes machine-readable instructions executable by the processor 102. The modules of the ADS 162 include: vehicle localization module 164; parking assistance module 166; autonomous parking module 168; driving assistance module 170 for semi-autonomous driving; path planning module 174; perception module 176; and other modules 178. Other modules 178 include for example mapping module, navigation module, climate control module, media player module, telephone module and messaging module, etc. are also stored in the memory 126. In some embodiments, the perception module 176, include machine-readable instructions which, when executed by the processor 102, causes the operations of methods described herein to be performed.

Although shown as separate modules, the parking assistance module 166, autonomous parking module 168, driving assistance module 170, autonomous driving module 172, path planning module 174, or the perception module 176 may be combined with one or more of the other software modules in other embodiments.

A scanning LIDAR unit 114 may capture information in a wide view (e.g., 360° view) about the vehicle 100. The scanning LIDAR unit 114 captures three-dimensional (3D) information about the environment, and generates a point cloud in 3D coordinate system. The data points collectively form a 3D point cloud.

Using the various sensing units 112, 114, 116, 117, 118, 119 the sensor system 110 may collect information about the local external environment of the vehicle 100 (e.g., any immediately surrounding obstacles) as well as information from a wider vicinity (e.g., the scanning LIDAR unit 114 may collect information from an area of up to 100-meter radius or more around the vehicle 100). The sensor system 110 may also collect information about the position and orientation of the vehicle 100 relative to a frame of reference (e.g., using the GPS unit 119). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer or inertial measurement unit), which may or may not be part of the sensor system 110, to determine the state of the vehicle 100, such as linear speed, angular speed, acceleration and tire grip of the vehicle 100. The sensor system 110 may repeatedly (e.g., in regular intervals) receive information from its sensing units in real-time or near real-time. The sensor system 110 may in turn provide sensor data 182 in real-time or near real-time to other components of the vehicle 100.

The memory 126 stores a variety of data 180. The data 180 may comprise sensor data 182 received from one or more of the sensors 110, user data 184 comprising user preferences, settings and optionally personal media files (e.g., music, videos, directions, etc.), and a download cache 186 comprising data downloaded via the wireless transceivers 130. For example, the memory 126 may store sensor data including image data representing a 2D image captured by a camera that is received from the cameras 112, data points representing a 3D point cloud received from the LIDAR scanning system 114, SAR data received from the SAR units 116, odometry data from wheel odometry unit 117 or an inertial measurement unit (IMU) 118, location data from global positioning system (GPS) 119, and data from other sensors 120. The odometry data received from the wheel odometry unit 117 includes rotation data indicative of rotation of the vehicle 100 and translation data indicative of a translation of the vehicle 100. The odometry data received from the IMU 118 includes velocity data representing three-axis angular velocity of the vehicle 100 and acceleration data representing three-axis acceleration of the vehicle 100.

In some embodiments, the processor 102 receives sensor data from the scanning LIDAR unit 114 mounted on the vehicle 100 and processes the sensor data to generate a 3D point cloud. The perception module 176 can receive image data representing 2D images and data points in a 3D point clouds from the memory 126, and output detected objects in the 2D images or 3D point clouds to other software modules of the ADS 160, such as the path planning module 174.

The sensor system 110 communicates with the perception module 176 via the processor 102 to provide sensor data 182, including a 3D point cloud to the perception module 176, which processes the sensor data 182 to detect and identify objects in the environment in which the vehicle 100 is operating in, for example to detect and identify a pedestrian or another car. The perception module 176 is configured to perform object detection, classification, regression, and segmentation on the data points in a 3D point cloud to detect and identify objects in the 3D point cloud. The perception module 176, in this example, processes data points in a point cloud to generate a group of BEV polygon points associated with an object detected in a 3D point cloud and processes the image data representing a 2D image to generate 2D bounding boxes associated with each object detected in the 2D image, as described in detail below.

The perception module 176 may be implemented using software, or a combination of hardware and software. For example, the perception module 176 may be include a dedicated image processor for performing image processing of image data representing a 2D image. Alternatively, the perception module 176 may include instructions that are executable by the processor 102 of a vehicle controller 115 of the vehicle 100. The perception module 176 may repeatedly (e.g., in regular intervals) receive sensor data, such as data points representing a 3D point cloud, from for example, the LIDAR unit 114 of the sensor system 110, or image data representing a 2D image, from for example, the camera 112 of the sensor system 110 and process the point cloud and the image data independently to detect and identify objects in real-time or near real-time. The output of the perception module 176 include, for example, information associated with a detected object, including an object class and a BEV bounding box associated with the detected object. The output of the perception module 176 may further include object segments (e.g., object masks), object location and object boundary, in 2D or 3D coordinate system, for one or more detected objects.

The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

The vehicle control system 115 comprises a satellite receiver 132 that may use signals received by a satellite receiver from a plurality of satellites in a satellite network to determine its position. The satellite network typically comprises a plurality of satellites which are part of at least one Global Navigation Satellite System (GNSS) that provides autonomous geo-spatial positioning with global coverage. For example, the satellite network may be a constellation of GNSS satellites. Example GNSSs include the United States NAVSTAR Global Positioning System (GPS) or the Russian Global Navigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The vehicle 100 may include other components that are not shown, including, for example, a user interface system and a wireless communication system (e.g., including an antenna). These other components may also provide input to or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

The perception module 176 is configured to generate a bounding box in a bird's eye view (BEV) associated with an object that is, for example, in proximity to the vehicle 100. The resulting BEV bounding box can then be used by the other modules of the ADS 162, including the path planning module 174.

A proposed method to generate a BEV bounding box associated with an object uses information generated when processing 2D image data from 2D images and 3D data points from 3D point clouds taken during the same time period to generate the BEV bounding box in real time, without the need for machine learning, thereby requiring less computational resources on a memory restrained vehicle. More specifically, during the mentioned time period, a set of 2D images and a set of corresponding 3D point clouds are processed by the perception module 176 to generate a set of information for an object identified in the set of 2D images and an object cluster for an object in the set of the 3D point clouds. Each 2D image from the set of 2D images corresponds to a respective 3D point cloud from the set of corresponding 3D point clouds, in the sense that a 2D image and a corresponding 3D point cloud are captured at around the same time by different sensors, at respective, discrete points in time.

Figure 2:
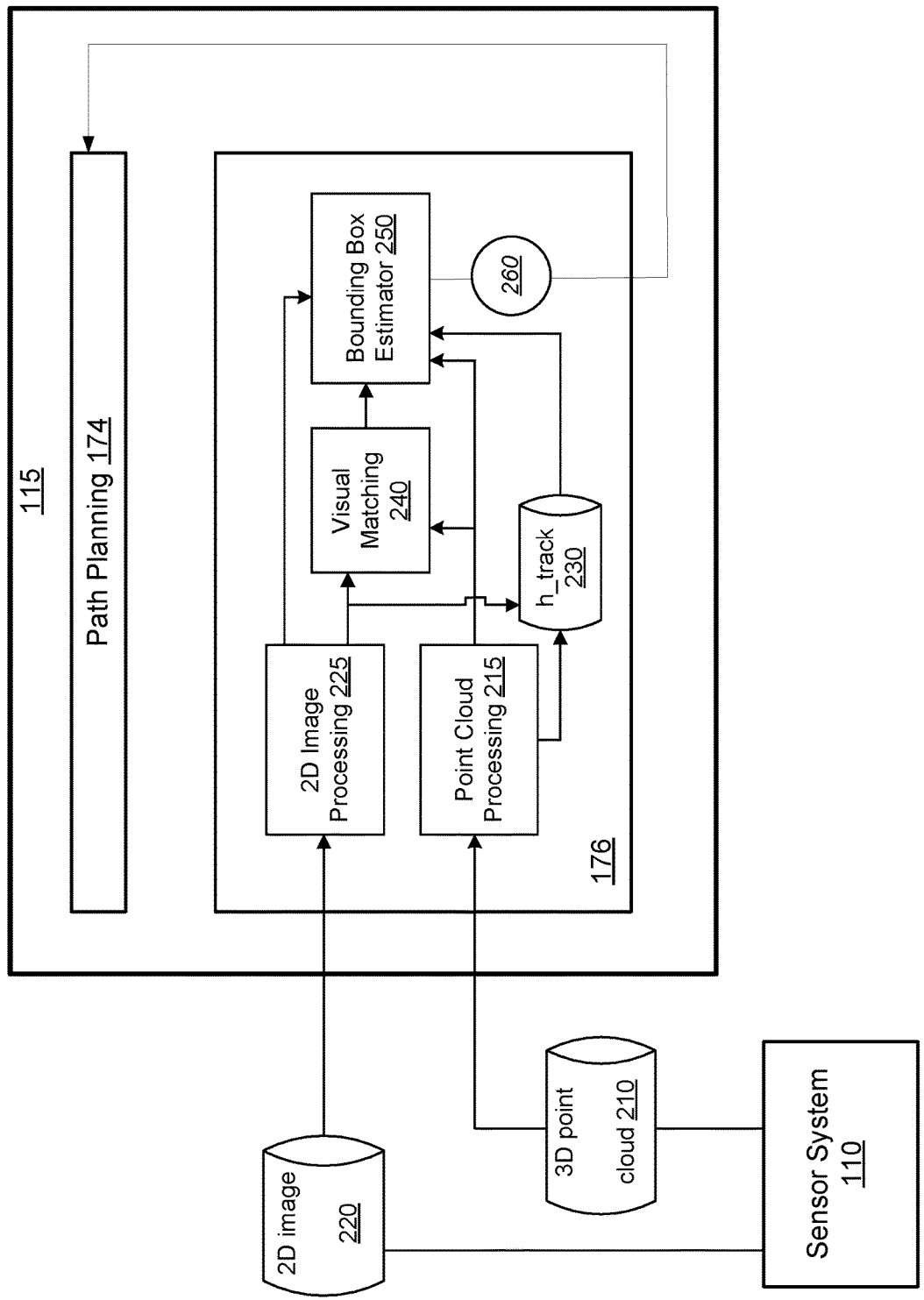
FIG. 2 is a block diagram illustrating example components for generating a BEV bounding box within a computer vision system on a vehicle.

FIG. 2 is a block diagram illustrating example perception module 176 for generating a BEV bounding box associated with an object. The perception module 176 can be configured to: process one or more 2D images 220 using a 2D image processing method 225; process one or more 3D point clouds 210 using a point cloud processing method 215; generate a pairing between a 2D image 220 and a 3D point cloud 210 using a visual matching process 240, and finally outputs a Bird's Eye View (BEV) bounding box 260 using a bounding box estimator 250.

The perception module 176 receives a 3D point cloud 210, for example, from the LIDAR unit 114 of the sensor system 110. The LIDAR unit 114 sweeps multiple laser beams across the surrounding environment of the vehicle 100. The 3D point cloud 210 includes multiple laser points where the laser beams were reflected by objects. Each laser point may be referred to as a 3D data point. A point cloud is a collection of the 3D data points collected in one round (e.g., 360°) of laser-beam sweeping by the LIDAR unit 114 forms the 3D point cloud 210. All the 3D data points in a 3D point cloud may be collectively referred to as point cloud. Each data point in the 3D point cloud is identified by a set of 3D coordinates (e.g., x, y and z values in meters) of a sensed object in a 3D coordinate system. Generally, the set of 3D coordinates of each data point in a 3D point cloud, and optionally other values (e.g., additional information such as intensity of reflected light or time of detection) may be represented using a one-dimensional vector. A 3D point cloud 210 corresponds to a scan of a physical environment surrounding the vehicle 100 at a particular time and is associated with a timestamp indicative of the particular time the 3D point cloud was generated. Multiple 3D point clouds 210 may each be associated with a respective timestamp in a set of consecutive timestamps. The data points in a 3D point cloud may be irregularly spaced, depending on the external environment. In some examples, in addition to 3D coordinates, each data point in the 3D point cloud may also contain other information, such as intensity of reflected light or time of detection.

In an example embodiment, the perception module 176 receives a 3D point cloud 210 and processes data points in the 3D point cloud 210 to generate one or more object clusters, where each object cluster is associated with an object in the physical environment identified in the 3D point cloud 210. An example process of generating an object cluster is described in detail below in association with FIG. 3. The perception module 176 may, based on an object cluster associated with an object identified in the 3D point cloud 210, generate an output, which is an estimated BEV bounding box 260 associated with the object represented by the object cluster. Even though there may be more than one object clusters generated for a given 3D point cloud 210, for the purpose of this disclosure, processing of only one object cluster is described. The same process may be applied to other object clusters simultaneously or concurrently in order to generate a BEV bounding box associated with each object cluster.

Referring now to FIG. 2, the perception module 176 is configured to receive image data representing a 2D image 220 captured by a camera 112 of the vehicle 100 at each time over a time period (e.g. ten 2D images over a span of 5 seconds). Each 2D image 220 is taken at a particular time by the camera 112 in the time period. A 2D image 220 is often obtained by a front-facing camera 112 mounted on the vehicle 100, and a bird's eye view (BEV) image of the 2D image 220 can be obtained by processing the image 220 through rotation, transformation, and projection onto a 2D plane using the vehicle and image coordinate systems. An image coordinate system is a coordinate system used by the camera 112, which may be different from that of the vehicle coordinate system. For example, points represented in an image coordinate system are described with an origin located at the optical center of the camera 112. A 2D image 220 includes one or more objects, such as another vehicle, a building, a pedestrian, a traffic light, and so on. The perception module 176 may process the image data representing the 2D image 220 using a 2D image processing method 225 to perform object detection to determine a set of information regarding the object in the 2D image 220: e.g., a class label associated with the object, a size of the object or a center of the object. For example, a size of the object may be represented by fitting a 2D minimum bounding box, which is the smallest rectangular box that can be fit around the object, and measuring the dimensions (l, w) of the 2D minimum bounding box, where l represents an estimated length and w represents an estimated width. The units of the length and width may be in pixels, or in standard measurement units such as inches, feet or meters. The center of an object may be represented by a location coordinate in an image coordinate system, or a location coordinate in a vehicle coordinate system of the vehicle 100.

When a series of 2D images 220 are captured by the camera 112 over a short period of time, some objects likely appear multiple times in the series of 2D images 220 captured by the camera 112. The perception module 176 can implement the 2D image processing method 225 to generate a variety of information regarding each of one or more objects in a sequence of 2D images 220. The information may include, for example, a class label of each object, a respective classification score for the class label of each object, a size of each object, and an image heading $h_{image}$ of each object, and an image heading uncertainty $\sigma_{image}^2$ associated with the image heading $h_{image}$ of the object, where $h_{image} \in R$ and $\sigma_{image}^2 \in R^+$. A classification score may be defined as a predicted probability value of the class indicated by the class label, from a set of predefined classes, that has the highest value. For example, a classification score may range from 0 to 100 out of 100, and a classification score of 97 associated with a class label "pedestrian" for an object means there is a 97% likelihood that the object is a pedestrian.

An image heading $h_{image}$ of an object may be obtained if the object appears at least twice across a series of 2D images 220, over a short period of time. The image heading represents a heading of the object determined based on 2D images. The perception module 176 processes the image data representing each 2D image 220 to perform object detection. The perception module 176 also processes the image data representing each 2D image 220 to perform object classification to generate a class label associated with the object, for example, a class label that indicates that the object is a vehicle, a building, a pedestrian, or a traffic light and in some embodiments, a class label that indicates that the object is a specific type of a vehicle, e.g. a sedan or a truck. Each class label associated with an object may further be associated with a classification score that represents how confident the perception module 176 is in the prediction of the class label. Once the object is detected and classified across multiple 2D images in the series of 2D images 220, the image heading $h_{image}$ may be computing based on its relative location within each 2D image 220. The image heading $h_{image}$ is typically a 2D vector in the xy plane of the vehicle coordinate system of the vehicle 100 from bird's eye view.

The image heading uncertainty or $\sigma_{image}^2$ associated with the image heading $h_{image}$ of the object indicates a confidence score associated with the heading $h_{image}$ of the object. In some embodiments, $h_{image}$ and $\sigma_{image}^2$ can be generated using an implementations of Kalman filter based on the center position of the object over multiple 2D images across consecutive timestamps. In other embodiments, $h_{image}$ and $\sigma_{image}^2$ is generated using a CNN designed for 2D object detection, with additional heading estimation or image processing techniques such as histogram of oriented gradients (HOG). Detailed description of various example methods for 2D object detection can be found in Z. Zhao, P. Zheng, S. Xu and X. Wu, "Object Detection With Deep Learning: A Review," in *IEEE Transactions on Neural Networks and Learning Systems*, vol. 30, no. 11, pp. 3212-3232, November 2019.

The perception module 176 is configured to, based on the object clusters 335 representative of a 3D object in the 3D point cloud 210 and a set of information including a class label, a respective classification score for each class label, a size, an image heading $h_{image}$, and an image heading uncertainty $\sigma_{image}^2$ associated with each image heading $h_{image}$ of a 2D object in the 2D image 220, generate a pairing between the 3D object from the 3D point cloud 210 and the 2D object from the 2D image 220 using the visual matching process 240. A pairing of a 3D object and a 2D object means that an object cluster 335 representative of the 3D object and the 2D object correspond to the same object at the same time frame in the environment in which the vehicle 100 operates in.

In some embodiments, the visual matching process 240 may be implemented to use point correspondence methods to find a corresponding 3D location coordinate for each pixel in the 2D object, and use the 3D location coordinates of the 2D object to find the corresponding 3D data points in the object cluster 335 of 3D data points to generate a pairing. In some embodiments, the visual matching process 240 can be implemented to project a 2D bounding box generated from a 2D image to 3D domain to find corresponding 3D data points in the object cluster 335 of 3D data points, as described in, for example: C. R. Qi, W. Liu, C. Wu, H. Su and L. J. Guibas, "Frustum PointNets for 3D Object Detection from RGB-D Data," 2018 *IEEE/CVF Conference on Computer Vision and Pattern Recognition*, Salt Lake City, Utah, 2018, pp. 918-927; and in Gong, Zheng and Lin, Haojia and Zhang, Dedong and Luo, Zhipeng and Zelek, John and Chen, Yiping and Nurunnabi, Abdul and Wang, Cheng and Li, Jonathan, "A Frustum-based Probabilistic Framework for 3D Object Detection by Fusion of LiDAR and Camera Data", *ISPRS Journal of Photogrammetry and Remote Sensing*, Volume 159, January 2020, Pages 90-100.

In other embodiments, the visual matching process 240 may be implemented to start with the object cluster 335 of data points representative of the 3D object in the 3D point cloud and proceed to find a 2D object that matches the cluster of data points in the 3D point cloud to generate the pairing. The output of the visual matching process 240 includes information identifying each pairing of a cluster of data points and a corresponding 2D object. For example, a unique identifier may be assigned to the object cluster 335 of 3D data points and the corresponding 2D object deemed to be a pairing. Each pairing of cluster of 3D points 335 and its corresponding 2D object may be then stored in a local memory storage for further processing.

A BEV bounding box estimator 250 is configured to output an estimated BEV bounding box 260 for the object located in the 3D point cloud 210 based on the object cluster 335 of the object, a set of information regarding the same object obtained from the 2D image 220, pairings between one or more object clusters for 3D objects and corresponding 2D objects obtained after the visual matching process 240, and optionally, a tracked heading $h_{track}$ 230 of the object.

In some embodiments, the perception module 176 may determine a tracked heading $h_{track}$. Alternatively, the tracked heading $h_{track}$ may be determined by a tracking module. The tracked heading $h_{track}$ may be converted to a 2D vector in the xy-plane of the vehicle coordinate system of the vehicle 100, similar to the image heading $h_{image}$ of the object, which is obtained from the 2D image. A tracked heading uncertainty (e.g. variance) $\sigma_{track}^2$ associated with the tracked heading $h_{track}$ of the object, which may be also optional to the perception module 176, indicates a confidence score associated with the heading $h_{track}$ of the object. In some embodiments, $\sigma_{track}^2$ can be generated using an implementations of Kalman filter. A description of an example method of the Kalman filter may be found in, for example, S. Rowels and Z. Ghahramani, "A Unifying Review of Linear Gaussian Models," in *Neural Computation*, vol. 11, no. 2, pp. 305-345, 15 Feb. 1999.

In some embodiments, the tracked heading $h_{track}$ of the object is computed using a multi-target tracking method, which may use Kalman filtering to predict the position of a target in a given (e.g. a most recent) image or 3D point cloud based on information from a set of 2D images or 3D point clouds immediately preceding the given image or 3D point cloud. The perception module 176 may use data representing dynamics of one or more objects from 3D point cloud 210 as determined by the point cloud processing method 215, or data representing dynamics of one or more objects in the 2D images 220 as determined by the 2D image processing method 225, in order to determine a variety of information regarding each of the one or more objects present in the 2D images 220. For example, the 2D image processing method 225 may be implemented to use a set of information regarding the objects, including for example an object ID, a location, as well as their respective 2D minimum bounding box across the set of 2D images immediately preceding the given (e.g., most recent) image, to determine the tracked heading $h_{track}$ 230 of the object. Optionally, the point cloud processing method 215 may also be implemented to use a set of information regarding the objects, each represented by an object ID, as well as their respective 3D bounding box, across the set of 3D point clouds immediately preceding the given 3D point cloud, to determine the tracked heading $h_{track}$ of the object. The set of 2D images and the set of 3D point clouds may be captured in the same time period, and the same object may be associated with the same object ID in both the 2D image and the 3D point cloud. For a given object identified in a 2D image or 3D point cloud taken at a current time t, the perception module 176 needs historical information from 2D images or 3D point clouds taken up to time t, in order to predict the estimations for the object in the current time t. The perception module 176 may execute the multi-target tracking method to compute, in real time or near real time, various estimations regarding the object, including for example velocity, position, acceleration, class, heading, and an estimated uncertainty of the heading, of the object.

It is worth noting that Kalman filtering (i.e. linear quadratic estimation), which may be an extended Kalman filtering, is one example process that can be used by the perception module 176 to determine the tracked heading $h_{track}$ of an object. In some embodiments, instead of (or in addition to) using Kalman filtering, other processes may be used to determine the tracked heading $h_{track}$ of the object, such as for example a Markov process, a Hidden Markov Model (HMM), a recursive Bayes filter, or a particle filter.

Figure 3:
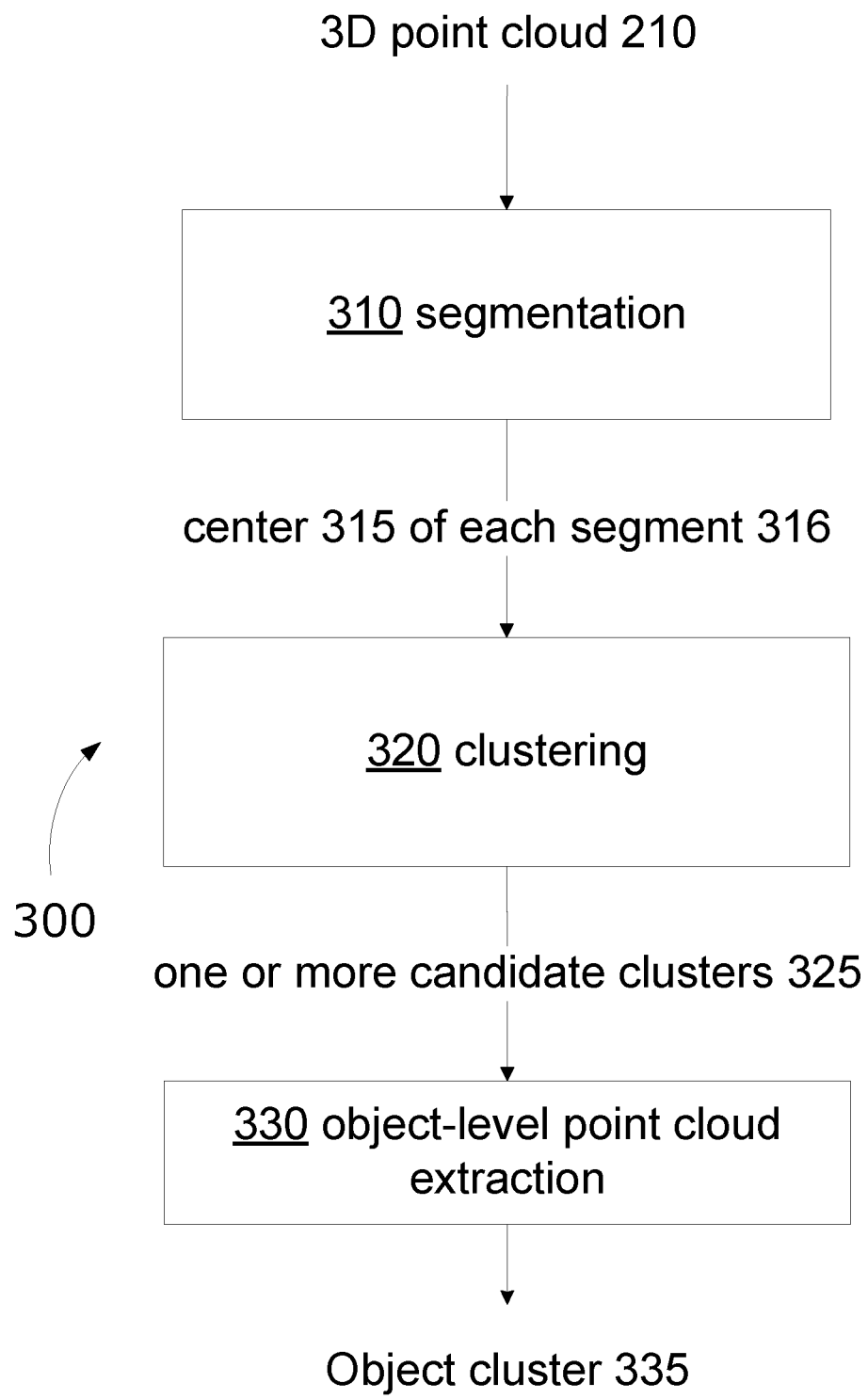
FIG. 3 is an example flow chart illustrating an example method for generating a point cluster for an object within a 3D point cloud.

Referring now to FIG. 3, which shows an example flow chart illustrating an example method 300 for generating an object cluster 335 of data points for an object within a 3D point cloud 210 by the perception module 176. The perception module 176 may generate the object cluster 335 using the point cloud processing method 215, which may include instructions that when executed by the processor 102 of the vehicle 100, performs the steps described herein. At step 310, a segmentation process is carried out on the data points in a 3D point cloud 210 to determine one or more segments 316 in the 3D point cloud. Each segment 316 represents a candidate for an object in the 3D point cloud and has a center 315. At step 320, which may be optional, point clustering is performed on each segment 316 to obtain one or more candidate clusters 325, where each candidate cluster 325 represents a candidate object. The point clustering process may be based on inter-point distance, as two data points of different objects may have some distance between them. At step 330, which may be optional, object-level point cloud extraction may be performed for each candidate cluster 325 to obtain an object cluster 335 of 3D data points for each object in the 3D point cloud 210. This step may include a filtering process to remove outliner candidate cluster(s) 325 that are too small to be considered an object that needs to be considered by the vehicle 100 during driving, or that has insufficient data points in the candidate cluster 325 to be an object. The filtering process may also remove candidate clusters 325 that are too insignificant or too far to the vehicle 100, such as a tree branch. Each data point in the 3D object cluster 335 has a respective set of Cartesian coordinates $(x_i, y_i, z_i)$ in the 3D coordinate system of the the LIDAR unit 114.

The perception module 176 is configured to generate a BEV bounding box 260, for example using the bounding box estimator 250, based on an object cluster 335 of an object from a 3D point cloud 210, a set of information regarding the same object from a 2D image 220, and optionally the tracked heading $h_{track}$ 230 of the object. In particular, the BEV bounding box estimator 250 may be implemented to determine and store a group of BEV polygon points on a 2D plane (e.g. the xy-plane) in BEV in the vehicle coordinate system of the vehicle 100, based on the object cluster 335 of 3D data points for the 3D object. This requires, firstly, mapping of the object cluster 335 of 3D data points to a cluster of 2D data points 410 (see FIG. 4A) on the 2D plane in BEV, which includes changing the frame of reference for the object cluster 335 of 3D data points from the 3D point cloud coordinate system to the vehicle coordinate system, i.e., transforming the object cluster 335 of 3D data points to the vehicle coordinate system, and then assigning a value of zero for the z-axis variable for all data points in the cluster of 2D data points 410. In some embodiments, the BEV bounding box estimator 250 can be configured to select data points from the object cluster 335 of 3D data points with specific height and depth conditions as data points 410 on the 2D plane. In some embodiments, the BEV bounding box estimator 250 can use a conventional occupancy grid map generator of different size or resolution to create a BEV data representation of the cluster of data points on the 2D plane in BEV.

Figure 4A:
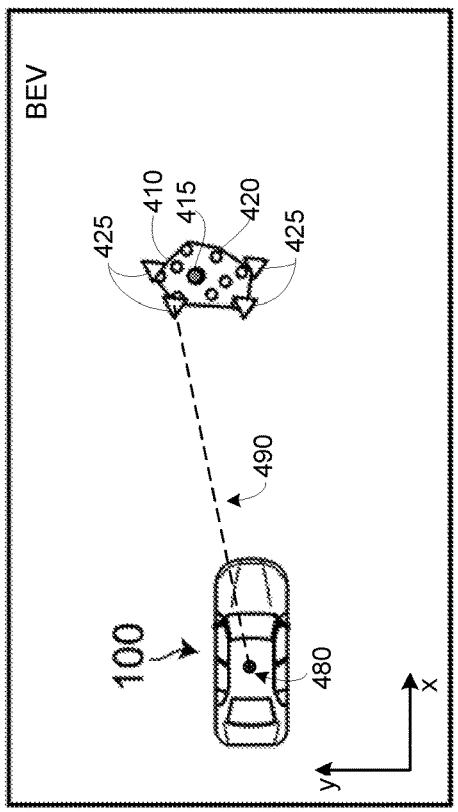
FIGS. 4A to 4D illustrate a process of generating a BEV bounding box for an object using a 3D point cloud.

The BEV bounding box estimator 250 then determines and stores a group of BEV polygon points $p_{conv}$ 420 for the 3D object on the 2D plane in BEV, where the group of BEV polygon points $p_{conv}$ 420 forms a convex hull enclosing the cluster of 2D data points 410 on the 2D plane. FIG. 4A shows a cluster of 2D data points 410 in proximity to the vehicle 100, on the 2D plane in BEV in the vehicle coordinate system. Generally speaking, polygon points $p_{conv}$ 420 are selected from the cluster of points 410, and the polygon point 420 serve as vertices of the convex hull enclosing the cluster of 2D data points 410.

Next, the BEV bounding box estimator 250 determines a center $p_{center} = (x_c, y_c)$ 415 of the cluster of 2D data points 410 on the 2D plane. In some embodiments, the center $p_{center}$ 415 can be computed based on an average value of the cluster of 2D data points 410. For example, $x_c$ can be computed as the mean across $\{x_1, x_2 \ldots x_n\}$, and $y_c$ can be computed as the mean across $\{y_1, y_2 \ldots y_n\}$, where $(x_i, y_i)$, $i=1, 2 \ldots n$ represents the respective coordinates for each point 410 from the cluster of 2D data points 410 on the 2D plane in BEV in the vehicle coordinate system.

In order to update the orientation for the cluster of 2D data points 410, the BEV bounding box estimator 250 needs to determine an estimated heading $h_{obj}$ 450 of the object represented by the cluster of data points 410. The estimated heading $h_{obj}$ 450 may be determined based on the image heading $h_{image}$ 235 of the object, and the tracked heading $h_{track}$ 230 of the object. For example, the estimated heading $h_{obj}$ 450 may be determined as a mean value of $h_{image}$ and $h_{track}$, i.e., $$h_{obj} = \frac{(h_{image} + h_{tracking})}{2}.$$

In some embodiments, where the tracked heading $h_{track}$ 230 of the object might not be readily available, the estimated heading $h_{obj}$ 450 may be determined based on the image heading $h_{image}$ 235 of the object alone. For example, $h_{track} = h_{image}$. In some embodiments, $h_{track}$ may be a refined value based on $h_{image}$ and the corresponding image heading uncertainty $\sigma_{image}^2$.

In addition, an estimated heading uncertainty $\sigma_{obj}^2$ of the object may be determined based on the image heading uncertainty $\sigma_{image}^2$ and the tracked heading uncertainty $\sigma_{track}^2$. For example, the estimated heading uncertainty $\sigma_{obj}^2$ may be determined as a mean value of $\sigma_{image}^2$, and $\sigma_{track}^2$, i.e., $[[\sigma_{obj}^2 = \sigma_{image}^2 + \sigma_{track}^2]]$ $$\sigma_{obj}^2 = \frac{\sigma_{image}^2 + \sigma_{track}^2}{2}.$$

Figure 4B:
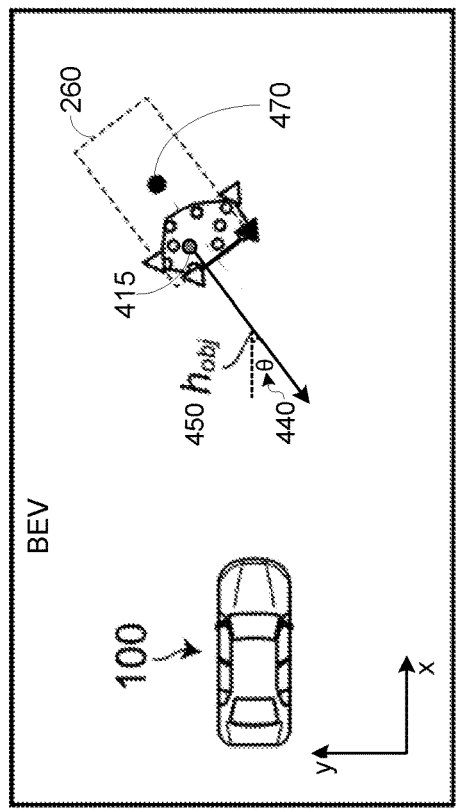

Once the estimated heading $h_{obj}$ 450 is obtained, the BEV bounding box estimator 250 may be configured to rotate the cluster of data points 410 around the center $p_{center}$ based on the estimated heading $h_{obj}$ 450, such as by an amount equal to the angle 440, which is represented by θ, between the estimated heading $h_{obj}$ 450 and the x-axis of the 2D plane, in the direction 460 shown in FIG. 4A. After the rotation, the cluster of data points 410 on the 2D plane is axis-oriented (also known as axis-aligned) with the vehicle 100 in the vehicle coordinate system, as shown in FIG. 4B.

After the rotation, the BEV bounding box estimator 250 may be configured to select one or more polygon points 425 from the group of BEV polygon points 420 based on a distance of the polygon point 420 to a center 480 of the vehicle 100. The distance 490, represented by D, between the center $(x_v, y_v)$ 480 of the vehicle 100 and a polygon point $(x_p, y_p)$ 420 can be computed by the Euclidean distance as follows:

$$D = \sqrt{(x_p - x_v)^2 + (y_p - y_v)^2}.$$

In some embodiments, the BEV bounding box estimator 250 is configured to select N polygon points 425 that have the shortest respective distance 490 D to the center 480 of the vehicle 100. N can be any natural number ranging from 1 to the total number of polygon points 420, and may be pre-determined based on a variety of factors such as computing resource constraints of the vehicle 100, or estimated uncertainty of the tracked heading $h_{track}$ 230 of the object. Based on this criteria, FIG. 4B shows four selected polygon points 425.

Figure 4C:
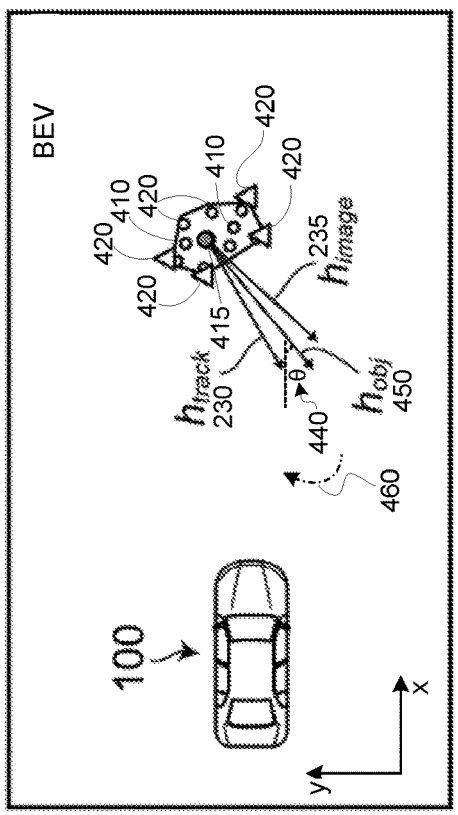

Once the selected polygon points 425 are determined, the BEV bounding box estimator 250 may be configured to determine a plurality of candidate bounding boxes. Each selected polygon point 425 has a corresponding candidate bounding box. For example, a candidate bounding box 430b from FIG. 4C is determined based on selected polygon point 425 from the plurality of selected polygon points 425. A candidate bounding box 430b is typically a rectangle of length $l_c$ and width $w_c$. The size of each candidate bounding box is determined based on the size of the object represented by the cluster of points 410, and more specifically, based on the dimensions of the 2D minimum bounding box generated by the 2D image processing method 225. The size of 2D minimum bounding box associated with the object has the dimensions (l, w), where l represents an estimated length and w represents an estimated width. The estimated dimensions (l, w) of the 2D minimum bounding box may be based on a class label associated with the object as output by the 2D image processing method 225. For example, if the 2D image processing method 225 has generated a class label of "sedan vehicle" for the object, the dimension of the 2D minimum bounding box determined by the 2D image processing method 225 may be different from the dimensions of a 2D minimum bounding box for an object classified as a pedestrian.

In order to find the best candidate bounding box 430b for a given selected polygon point 425, the BEV bounding box estimator 250 may be configured to first generate four rectangle boxes 430*a*, 430*b*, 430*c*, 430*d* for the selected polygon point 425, as shown in FIG. 4C. The dimensions of the four rectangle boxes, namely, length $l_b$ and width $w_b$, are equal to the respective length and width of the 2D minimum bounding box for the object generated by the 2D image processing method 225. Since the cluster of data points 410 is now axis-oriented with the vehicle 100, the four rectangle boxes 430*a*, 430*b*, 430*c*, 430*d* should also be axis-oriented with the vehicle 100. Each rectangle box has a respective first side parallel to the x-axis of the vehicle coordinate system, and a respective second side parallel to the y-axis of the vehicle coordinate system.

In addition, the four rectangle boxes 430*a*, 430*b*, 430*c*, 430*d* are arranged to surround the selected polygon point 425, with each rectangle box occupying a respective quadrant as shown in FIG. 4C. For example, rectangle box 430*a* is disposed in the upper left quadrant, rectangle box 430*b* is disposed in the upper right quadrant, rectangle box 430*c* is disposed in the lower right quadrant, and rectangle box 430*d* is disposed in the lower left quadrant. Furthermore, each rectangle box has a respective corner overlapping with the selected polygon point 425. For example, rectangle box 430*a* has a lower right corner overlapping with the selected polygon point 425, rectangle box 430*b* has a lower left corner overlapping with the selected polygon point 425, rectangle box 430*c* has an upper left corner overlapping with the selected polygon point 425, and rectangle box 430*d* has an upper right corner overlapping with the selected polygon point 425.

Once all four rectangle boxes 430*a*, 430*b*, 430*c*, 430*d* have been disposed around the selected polygon point 425 in the configuration described above, the BEV bounding box estimator 250 may be configured to select one rectangle box 430*b* from the four rectangle boxes 430*a*, 430*b*, 430*c*, 430*d* to be the candidate bounding box for the selected polygon point 425, where the selected rectangle box 430*b* covers the most number of data points from the cluster of data points 410 compared to the rest 430*a*, 430*c*, 430*d* of the four rectangle boxes.

The BEV bounding box estimator 250 is configured to determine a candidate bounding box for each selected polygon point 425. If there are N selected polygon points 425, then there are N candidate bounding boxes. The BEV bounding box estimator 250 can then select a final bounding box from the N candidate bounding boxes to be the BEV bounding box 260, where the final bounding box covers the most number of data points from the cluster of data points 410 on the 2D plane among all the candidate bounding boxes.

Figure 4D:
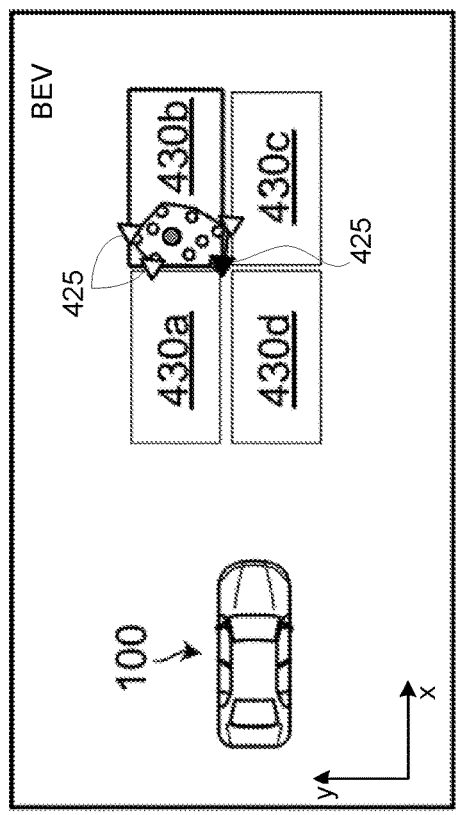

Next, as shown in FIG. 4D, the BEV bounding box estimator 250 is configured to rotate the BEV bounding box 260 based on the value of $h_{obj}$ 450 around the center $p_{center}$ 415 of the cluster of data points on the 2D plane, so that the orientation of the BEV bounding box 260 is once again aligned with the original cluster of data points 410 as shown in FIG. 4A. In some embodiments, the BEV bounding box estimator 250 is configured to rotate the BEV bounding box 260 by an amount equal to the angle 440, represented by θ, between the estimated heading $h_{obj}$ 450 and the x-axis of the 2D plane, in the opposite direction of the direction 460 for the previous rotation in FIG. 4A.

After rotating the BEV bounding box 260, a center 470 of the BEV bounding box 260 may be determined based on the dimensions $l_b$, $w_b$ and the position of the BEV bounding box 260.

Figure 5:
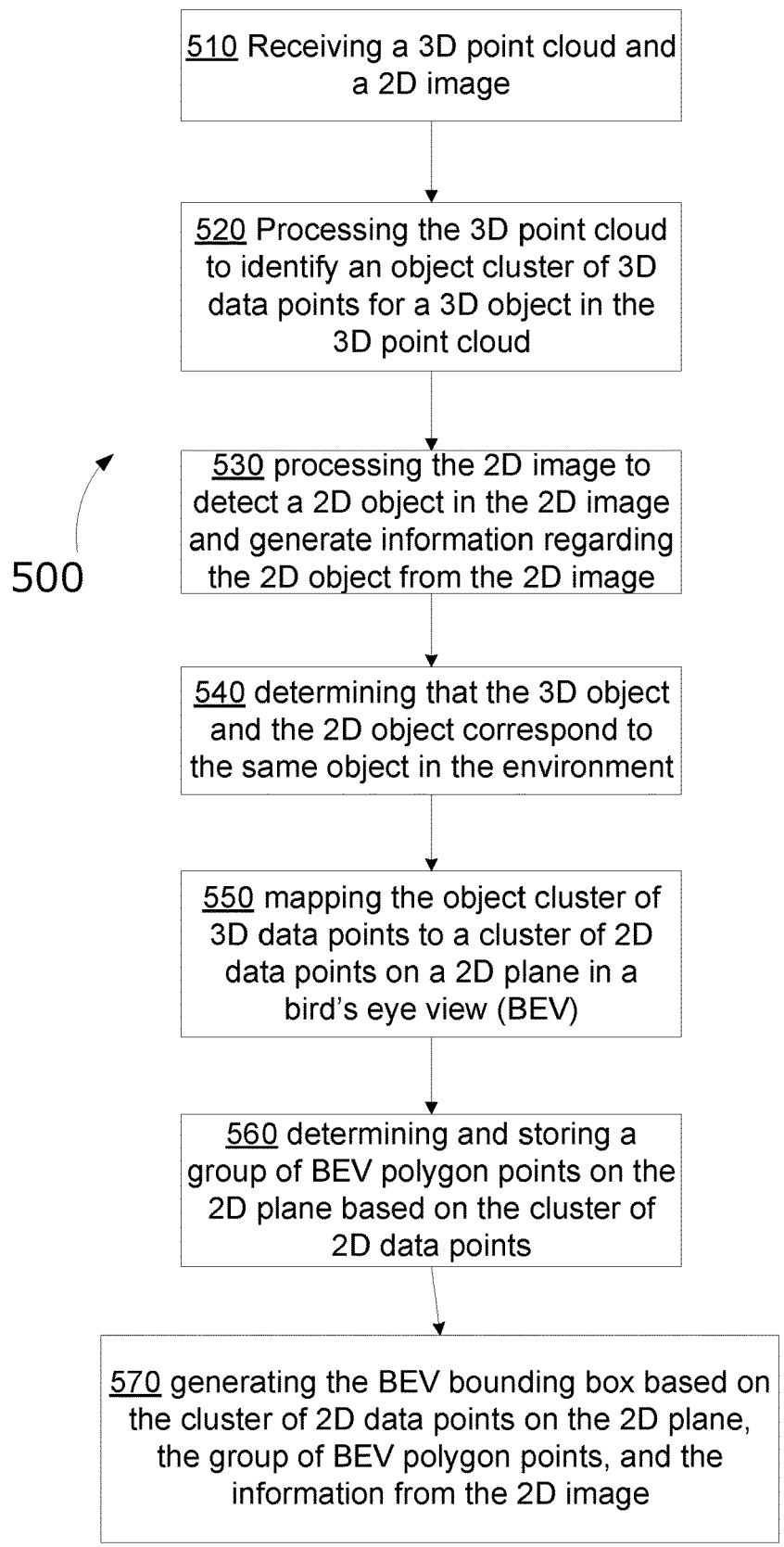
FIG. 5 is a flowchart illustrating an example method for generating a BEV bounding box for an object using a 3D point cloud and a 2D image.

FIG. 5 is a flowchart illustrating an example method 500 for generating a BEV bounding box 260 for an object detected in an environment in which the vehicle 100 operates. The method 500 is carried out by software of the perception module 176 of the vehicle 100 executable by the processor 102 of the vehicle control system 115. Coding of the software for carrying out the method 500 is within the scope of a person of ordinary skill in the art given the present disclosure. Machine-readable instructions of the software that is executable by a processor 102 of the vehicle control system 115 to perform the method 500 may be stored in a computer-readable storage medium, such as a non-transitory computer-readable medium.

At step 510, the perception module 176 receives data representing a 3D point cloud 210 and data representing a 2D image 220, which may be in real time (or near real time) from the sensor system 110 of the vehicle 100. The 3D point cloud 210 and 2D image 220 may each be associated with a timestamp. The 3D point cloud 210 corresponds to a scan of an environment in which the vehicle 100 is operating in at a particular point in time. In some embodiments, the perception module 176 may receive a series of 3D point clouds 210 and a series of 2D images 220 captured by the camera 112 of the vehicle 100 over a time period, where each 3D point cloud in the series of 3D point clouds is associated with the same timestamp as a respective 2D image 220 from the series of 2D images 220. A 2D image 220 includes one or more objects, such as another vehicle, a building, a pedestrian, a traffic light, and so on.

At step 520, the perception module 176 processes the 3D point cloud 210 and the image data representing each 2D image 220 to visually match a 3D object from the 3D point cloud 210 to a corresponding 2D object in the 2D images 220. The perception module 176 may be configured to process the the 3D point cloud 210 to generate an object cluster 335 of 3D data points for at least one object detected in the 3D point cloud 210. In some embodiments, the perception module 176 can generate a respective object cluster 335 of 3D data points for each object detected in the 3D point cloud 210. Each 3D data point in the object cluster 335 of 3D data points each has a respective set of coordinates $(x_i, y_i, z_i)$ in the 3D coordinate system of the LIDAR unit 114.

In addition, the perception module 176 processes the image data representing each 2D image 220 to perform object detection and classification in order to determine various information regarding the object, such as a class label associated with the object, a size and a center of the object. The size and center of the object may be computed based on a 2D minimum bounding box for the object in the 2D images 220. In addition, the perception module 176 may determine, based on a series of 2D images 220 across consecutive times, an image heading $h_{image}$ 235 of each object, and an image heading uncertainty $\sigma_{image}^2$ associated with the image heading $h_{image}$ 235 of each object, where $h_{image} \in \mathbb{R}$ and $\sigma_{image}^2 \in \mathbb{R}^+$.

Then the perception module 176 is configured to, using a visual matching process 240, generate a pairing between a 3D object from the 3D point cloud 210 and a 2D object from the 2D image 220, based on an object cluster 335 of 3D data points for the 3D object and a set of information regarding the 2D object. The output of the visual matching process 240 includes information identifying each pairing of an object cluster of 3D data points and a corresponding 2D object. For example, a unique identifier may be assigned to the object cluster 335 of 3D data points and the corresponding 2D object deemed to be a pairing. Each pairing of cluster of 3D points 335 and its corresponding 2D object may be then stored in a local memory storage for further processing.

At step 530, a BEV bounding box estimator 250 of the perception module 176 can determine, based on the object cluster 335 of 3D data points in 3D, a corresponding cluster of (2D) data points 410 on a 2D plane in Bird's-Eye-View (BEV) in the vehicle coordinate system of the vehicle 100. In some embodiments, the BEV bounding box estimator 250 is configure to first map the object cluster 335 of 3D data points to a cluster of 2D points 410 on the 2D plane in BEV, which includes changing the frame of reference for the object cluster 335 of 3D data points from the 3D coordinate system of the sensor that has generated the 3D point cloud 210 (e.g. the LIDAR unit 114) to the vehicle coordinate system, i.e., transforming the object cluster 335 of 3D data points to the vehicle coordinate system, and then assigning a value of zero for the z-axis variable for all data points in the cluster of 2D data points 410.

At step 540, the BEV bounding box estimator 250 determines a group of BEV polygon points 420 forming a convex hull enclosing the cluster of data points 410 on the 2D plane. The group of BEV polygon points 420 may be determined based on conventional algorithms and methods that construct convex hulls out of 2D points, such as for example, polyshape( ) functions from Matlab™ libraries. The polygon points 420 are vertices of the constructed convex hull enclosing the cluster of data points 410.

At step 550, the BEV bounding box estimator 250 can generate a BEV bounding box 260 for the object based on the cluster of data points 410, the group of BEV polygon points 420, and the set of information obtained from the 2D image, as described below in reference to method 600 in FIG. 6.

At step 560 In some embodiments, the perception module 176 can output a range of information regarding the BEV bounding box 260, including dimensions (e.g., width, height, length), coordinates of a center along x-axis, coordinates of a center along y-axis, coordinates of a center along z-axis, and an angle of the BEV bounding box. In some embodiments, a path planning module 174 of the vehicle 100 may receive the BEV bounding box 260 and perform path planning for the vehicle 100 using, among other information (e.g. a state of the vehicle 100, a trajectory of the vehicle 100), the information regarding the BEV bounding box 260.

Figure 6:
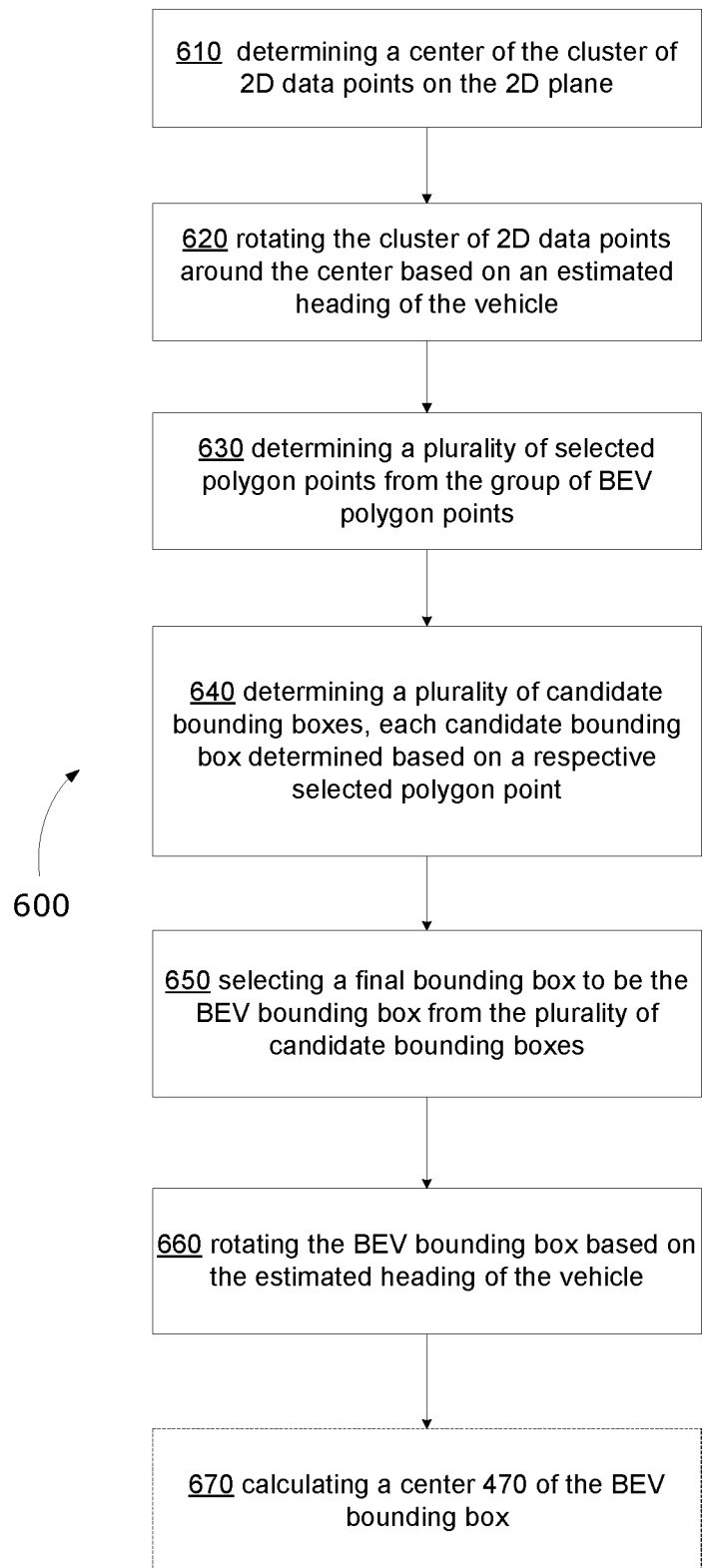
FIG. 6 is a flow chart illustrating an example method for generating a BEV bounding box for an object based on a cluster of 2D data points on the 2D plane.

FIG. 6 illustrates a flow chart illustrating an example method 600 for generating the BEV bounding box 260 by the perception module 176. In some embodiments, the method 600 may be performed by a bounding box estimator 250 that is implemented as part of the perception module 176. At step 610, the perception module 176 determines a center 415 of the cluster of 2D data points 410 on the 2D plane in BEV in the vehicle coordinate system. In some embodiments, the center 415 can be computed based on an average value of the cluster of 2D data points 410.

At step 620, the perception module 176 rotates the cluster of 2D data points 410 around the center 415 based on an estimated heading $h_{obj}$ 450 of the vehicle 100. The estimated heading $h_{obj}$ 450 may be determined based on an average value of the image heading $h_{image}$ 235 of the object and the tracked heading $h_{track}$ 230 of the object, which may be obtained in real time or near real time. In some embodiments, where the tracked heading $h_{track}$ 230 of the object may not be readily available, the estimated heading $h_{obj}$ 450 may be determined based on the image heading $h_{image}$ 235 of the object alone. After the rotation, the cluster of 2D data points 410 and the BEV polygon points 420 are axis-aligned with the vehicle 100 in the vehicle coordinate system.

At step 630, the perception module 176 determines a plurality of selected polygon points 425 from the group of BEV polygon points 420. The selection may be based on a respective distance between each BEV polygon point 420 and a center 480 of the vehicle 100. If the respective distance is above a certain threshold, then the BEV polygon points 420 may be selected as one of closest polygon points 425.

At step 640, the perception module 176 determines a plurality of candidate bounding boxes, each candidate bounding box determined based on a respective selected polygon point 425. In order to determine the candidate bounding box for one selected polygon point 425, the perception module 176 generates multiple (e.g., such as four) rectangle boxes 430a, 430b, 430c, 430d for the selected polygon point 425, with each rectangle box 430a, 430b, 430c, 430d occupying a respective quadrant around the selected polygon point 425. Each rectangle box 430a, 430b, 430c, 430d is axis-aligned with the vehicle 100 in the vehicle coordinate system. The dimensions of the four rectangle boxes can be equal to the dimensions of the 2D minimum bounding box for the object determined earlier.

The rectangle box 430b covering the most number of cluster of 2D data points 410 is selected from the four rectangle boxes as the candidate bounding box for the respective polygon point 425. This process is repeated for each selected polygon point 425 in the N selected polygon points 425, to generate N candidate bounding boxes 430b.

At step 650, the perception module 176 selects a final bounding box to be the BEV bounding box 260 from the plurality of candidate bounding boxes, where the BEV bounding box 260 covers the most number of data points from the cluster of 2D data points 410 on the 2D plane.

At step 660, the perception module 176 rotates the BEV bounding box 260 based on the estimated heading $h_{obj}$ 450 around the center $p_{center}$ 415 of the cluster of 2D data points 410 on the 2D plane.

As an optional step, at step 670, the perception module 176 may compute a center 470 of the BEV bounding box 260 after the rotation in step 660, based on the dimensions and the position of the BEV bounding box 260.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A processor-implemented method for generating a bounding box for an object in proximity to a vehicle, the method comprising:
   receiving a three-dimensional (3D) point cloud representative of an environment;
   receiving a two-dimensional (2D) image of the environment;
   processing the 3D point cloud to identify an object cluster of 3D data points for a 3D object in the 3D point cloud;
   processing the 2D image to detect a 2D object in the 2D image and generate information regarding the 2D object from the 2D image, wherein the information from the 2D object comprises an image heading $h_{image}$ of the object, and an image heading uncertainty $\sigma_{image}^2$ associated with the image heading $h_{image}$ of the object; and
   when the 3D object and the 2D object correspond to the same object in the environment:
      generating a bird's eye view (BEV) bounding box for the object based on the object cluster of 3D data points and the information from the 2D image, the generating including:
         mapping the object cluster of 3D data points to a cluster of 2D data points on a 2D plane in a bird's eye view (BEV) and in a vehicle coordinate system of the vehicle;
         determining and storing a group of BEV polygon points on the 2D plane in the BEV, wherein the group of BEV polygon points forms a convex hull enclosing the cluster of 2D data points on the 2D plane;
         determining a center $p_{center}$ of the cluster of 2D data points on the 2D plane;
         determining an estimated heading $h_{obj}$ of the object;
         rotating the cluster of 2D data points on the 2D plane around the center $p_{center}$ based on the estimated heading $h_{obj}$;
         determining a plurality of selected polygon points from the group of BEV polygon points;
         determining a plurality of candidate bounding boxes, wherein each candidate bounding box is determined based on a respective selected polygon point from the plurality of selected polygon points, the determining including, for each respective polygon point of the plurality of selected polygon points:
            generating four rectangle boxes of a pre-determined size; and
            selecting a rectangle box from the four rectangle boxes to be the candidate bounding box for the respective polygon point, wherein the selected rectangle box covers the most number of data points from the cluster of 2D data points on the 2D plane compared to the rest of the four rectangle boxes;
         selecting a final bounding box to be the BEV bounding box from the plurality of candidate bounding boxes, wherein the final bounding box is one of the candidate bounding boxes that covers the most number of data points from the cluster of 2D data points on the 2D plane; and
         rotating the BEV bounding box based on the value of $h_{obj}$ around the center $p_{center}$ of the cluster of 2D data points on the 2D plane.

2. The method of claim 1, wherein:
   each of the four rectangle boxes has: a respective first side parallel to an x-axis of the vehicle in the vehicle coordinate system, and a respective second side parallel to a y-axis of the vehicle in the vehicle coordinate system; and
   the first of the four rectangle boxes has a lower right corner coinciding with the respective polygon point, the second of the four rectangle boxes has a lower left corner coinciding with the respective polygon point, the third of the four rectangle boxes has an upper right corner coinciding with the respective polygon point, and the fourth of the four rectangle boxes has a upper left corner coinciding with the respective polygon point.

3. A processor-implemented method for generating a bounding box for an object in proximity to a vehicle, the method comprising:
   receiving a three-dimensional (3D) point cloud representative of an environment;
   receiving a two-dimensional (2D) image of the environment;
   processing the 3D point cloud to identify an object cluster of 3D data points for a 3D object in the 3D point cloud;
   processing the 2D image to detect a 2D object in the 2D image and generate information regarding the 2D object from the 2D image, wherein the information from the 2D object comprises an image heading $h_{image}$ of the object, an image heading uncertainty $\sigma_{image}^2$ associated with the image heading $h_{image}$ of the object, a class label associated with the object, a classification score associated with the class label, and a size of the object;
   determining that the 3D object and the 2D object correspond to the same object in the environment based on: the class label associated with the object, the classification score associated with the class label, and the size of the object; and
   when the 3D object and the 2D object correspond to the same object in the environment:
      generating a bird's eye view (BEV) bounding box for the object based on the object cluster of 3D data points and the information from the 2D image, the generating including:
         mapping the object cluster of 3D data points to a cluster of 2D data points on a 2D plane in a bird's eye view (BEV) and in a vehicle coordinate system of the vehicle;
         determining and storing a group of BEV polygon points on the 2D plane in the BEV, wherein the group of BEV polygon points forms a convex hull enclosing the cluster of 2D data points on the 2D plane;

determining a center $p_{center}$ of the cluster of 2D data points on the 2D plane;

receiving or determine, a tracked heading $h_{track}$ of the object and a tracked heading uncertainty $\sigma_{track}^2$ associated with the tracked heading $h_{track}$ of the object;

computing and storing the estimated heading $h_{obj}$ of the object based on the image heading $h_{image}$ of the object and the tracked heading $h_{track}$ of the object;

computing and storing an estimated heading uncertainty $\sigma_{obj}^2$ of the object based on the image heading uncertainty $\sigma_{image}^2$ and the tracked heading uncertainty $\sigma_{track}^2$;

rotating the cluster of 2D data points on the 2D plane around the center $p_{center}$ based on the estimated heading $h_{obj}$;

determining a plurality of selected polygon points from the group of BEV polygon points;

determining a plurality of candidate bounding boxes, wherein each candidate bounding box is determined based on a respective selected polygon point from the plurality of selected polygon points;

selecting a final bounding box to be the BEV bounding box from the plurality of candidate bounding boxes, wherein the final bounding box is one of the candidate bounding boxes that covers the most number of data points from the cluster of 2D data points on the 2D plane; and rotating the final BEV bounding box based on the value of $h_{obj}$ around the center $p_{center}$ of the cluster of 2D data points on the 2D plane.

4. The method of claim 3, wherein $h_{obj}=f(h_{image}, h_{track})$ and f( ) is a function for computing an average value based on $h_{image}$ and $h_{track}$.

5. The method of claim 4, wherein $$h_{obj} = \frac{(h_{image} + h_{tracking})}{2}.$$

6. The method of claim 3, wherein $\sigma_{obj}^2 = (\sigma_{image}^2, \sigma_{track}^2)$ and g( ) is a function for calculating an average value based on $\sigma_{image}^2$, and $\sigma_{track}^2$.

7. The method of claim 6, wherein $$\sigma_{obj}^2 = \frac{\sigma_{image}^2 + \sigma_{track}^2}{2}.$$

8. A processing system for generating a bounding box for an object in proximity to a vehicle, the processing system comprising:

a processing unit; and a memory coupled to the processing unit, the memory storing machine-executable instructions that, when executed by the processing unit, cause the processing system to:

receive a 3D point cloud representative of an environment;

receive a 2D image of the environment;

process the 3D point cloud to identify a cluster of data points for a 3D object in the 3D point cloud;

process the 2D image to detect a 2D object in the 2D image and generate information regarding the 2D object from the 2D image, wherein the information from the 2D object comprises an image heading $h_{image}$ of the object, and an image heading uncertainty $\sigma_{image}^2$ associated with the image heading $h_{image}$ of the object; and when the 3D object and the 2D object correspond to the same object in the environment:

generate a bird's eye view (BEV) bounding box for the object based on the object cluster of 3D data points and the information from the 2D image, by:

mapping the object cluster of 3D data points to a cluster of 2D data points on a 2D plane in a bird's eye view (BEV) and in a vehicle coordinate system of the vehicle;

determining and storing a group of BEV polygon points on the 2D plane in the BEV, wherein the group of BEV polygon points forms a convex hull enclosing the cluster of 2D data points on the 2D plane;

determining a center $p_{center}$ of the cluster of 2D data points on the 2D plane;

determining an estimated heading $h_{obj}$ of the object;

rotating the cluster of 2D data points on the 2D plane around the center $p_{center}$ based on the estimated heading $h_{obj}$;

determining a plurality of selected polygon points from the group of BEV polygon points;

determining a plurality of candidate bounding boxes, wherein each candidate bounding box is determined based on a respective selected polygon point from the plurality of selected polygon points, the determining including, for each respective polygon point of the plurality of selected polygon points:

generating four rectangle boxes of a pre-determined size; and selecting a rectangle box from the four rectangle boxes to be the candidate bounding box for the respective polygon point, wherein the selected rectangle box covers the most number of data points from the cluster of 2D data points on the 2D plane compared to the rest of the four rectangle boxes;

selecting a final bounding box to be the BEV bounding box from the plurality of candidate bounding boxes, wherein the final bounding box is one of the candidate bounding boxes that covers the most number of data points from the cluster of 2D data points on the 2D plane; and rotating the BEV bounding box based on the value of $h_{obj}$ around the center $p_{center}$ of the cluster of 2D data points on the 2D plane.

9. The system of claim 8, wherein:

each of the four rectangle boxes has: a respective first side parallel to an x-axis of the vehicle in the vehicle coordinate system, and a respective second side parallel to a y-axis of the vehicle in the vehicle coordinate system; and the first of the four rectangle boxes has a lower right corner coinciding with the respective polygon point, the second of the four rectangle boxes has a lower left corner coinciding with the respective polygon point, the third of the four rectangle boxes has an upper right corner coinciding with the respective polygon point, and the fourth of the four rectangle boxes has a upper left corner coinciding with the respective polygon point.

10. A processing system for generating a bounding box for an object in proximity to a vehicle, the processing system comprising:
   a processing unit; and
   a memory coupled to the processing unit, the memory storing machine-executable instructions that, when executed by the processing unit, cause the processing system to:
      receive a 3D point cloud representative of an environment;
      receive a 2D image of the environment;
      process the 3D point cloud to identify a cluster of data points for a 3D object in the 3D point cloud;
      process the 2D image to detect a 2D object in the 2D image and generate information regarding the 2D object from the 2D image, wherein the information from the 2D object comprises an image heading $h_{image}$ of the object, an image heading uncertainty $\sigma_{image}^2$ associated with the image heading $h_{image}$ of the object, a class label associated with the object, a classification score associated with the class label, and a size of the object;
      determine that the 3D object and the 2D object correspond to the same object in the environment based on: the class label associated with the object, the classification score associated with the class label, and the size of the object; and
      when the 3D object and the 2D object correspond to the same object in the environment:
         generate a bird's eye view (BEV) bounding box for the object based on the object cluster of 3D data points and the information from the 2D image, by:
            mapping the object cluster of 3D data points to a cluster of 2D data points on a 2D plane in a bird's eye view (BEV) and in a vehicle coordinate system of the vehicle;
            determining and store a group of BEV polygon points on the 2D plane in the BEV, wherein the group of BEV polygon points forms a convex hull enclosing the cluster of 2D data points on the 2D plane;
            determining a center $p_{center}$ of the cluster of 2D data points on the 2D plane;
            receiving or determining a tracked heading $h_{track}$ of the object and a tracked heading uncertainty $\sigma_{track}^2$ associated with the tracked heading $h_{track}$ of the object;
            computing and storing the estimated heading $h_{obj}$ of the object based on the image heading $h_{image}$ of the object and the tracked heading $h_{track}$ of the object;
            computing and storing an estimated heading uncertainty $\sigma_{obj}^2$ of the object based on the image heading uncertainty a $\sigma_{image}^2$ and the tracked heading uncertainty $\sigma_{track}^2$
            rotating the cluster of 2D data points on the 2D plane around the center $p_{center}$ based on the estimated heading $h_{obj}$;
            determining a plurality of selected polygon points from the group of BEV polygon points;
            determining a plurality of candidate bounding boxes, wherein each candidate bounding box is determined based on a respective selected polygon point from the plurality of selected polygon points;
            selecting a final bounding box to be the BEV bounding box from the plurality of candidate bounding boxes, wherein the final bounding box is one of the candidate bounding boxes that covers the most number of data points from the cluster of 2D data points on the 2D plane; and
            rotating the BEV bounding box based on the value of $h_{obj}$ around the center $p_{center}$ of the cluster of 2D data points on the 2D plane.

11. The system of claim 10, wherein $h_{obj}=f(h_{image},h_{track})$ and f( ) is a function for calculating an average value based on $h_{image}$ and $h_{track}$.

12. The system of claim 11, wherein $$h_{obj} = \frac{(h_{image} + h_{tracking})}{2}.$$

13. The system of claim 10, wherein $\sigma_{obj}^2 = g(\sigma_{image}^2, \sigma_{track}^2)$ and g( ) is a function for computing an average value based on $\sigma_{image}^2$, and $\sigma_{track}^2$.

14. The system of claim 13, wherein $$\sigma_{obj}^2 = \frac{\sigma_{image}^2 + \sigma_{track}^2}{2}.$$

* * * * *